United States Patent
Desai et al.

(10) Patent No.: US 10,795,727 B2
(45) Date of Patent: Oct. 6, 2020

(54) FLEXIBLE AUTOMATED PROVISIONING OF SINGLE-ROOT INPUT/OUTPUT VIRTUALIZATION (SR-IOV) DEVICES

(71) Applicant: Nicira, Inc., Palo Alto, CA (US)

(72) Inventors: Kiran Desai, Santa Clara, CA (US); Nilesh Nipane, Mountain View, CA (US)

(73) Assignee: Nicira, Inc., Palo Alto, CA (US)

( * ) Notice: Subject to any disclaimer, the term of this patent is extended or adjusted under 35 U.S.C. 154(b) by 56 days.

(21) Appl. No.: 15/675,514

(22) Filed: Aug. 11, 2017

(65) Prior Publication Data

US 2019/0026154 A1    Jan. 24, 2019

Related U.S. Application Data

(60) Provisional application No. 62/534,572, filed on Jul. 19, 2017.

(51) Int. Cl.
  *G06F 9/50* (2006.01)
  *G06F 9/455* (2018.01)
  *G06F 9/48* (2006.01)

(52) U.S. Cl.
  CPC ........ *G06F 9/5027* (2013.01); *G06F 9/45554* (2013.01); *G06F 9/45558* (2013.01); *G06F 9/4856* (2013.01); *G06F 2009/4557* (2013.01); *G06F 2009/45562* (2013.01); *G06F 2009/45595* (2013.01); *G06F 2209/503* (2013.01); *G06F 2209/5011* (2013.01)

(58) Field of Classification Search
  CPC .................................................... G06F 9/5027
  See application file for complete search history.

(56) References Cited

U.S. PATENT DOCUMENTS

| | | | | |
|---|---|---|---|---|
| 2011/0179414 A1* | 7/2011 | Goggin | ................... | G06F 3/061 718/1 |
| 2014/0245298 A1* | 8/2014 | Zhou | ....................... | G06F 9/455 718/1 |
| 2016/0055025 A1* | 2/2016 | Jul | ....................... | G06F 9/45558 718/1 |
| 2017/0075713 A1* | 3/2017 | Le Bars | ............... | G06F 9/45558 |
| 2017/0147522 A1* | 5/2017 | Yu | ........................ | G06F 13/4022 |
| 2017/0185450 A1* | 6/2017 | Le Bars | ................ | G06F 9/4887 |

* cited by examiner

*Primary Examiner* — Charlie Sun
(74) *Attorney, Agent, or Firm* — Patterson + Sheridan, LLP

(57) ABSTRACT

Aspects of the present disclosure relate to flexible and automatic provisioning of virtual instances in a virtual network using single-root input/output virtualization. A device pool is defined that is associated with a virtual entity, such as a virtual switch, in a data center. The device pool identifies available physical hardware devices of one or more host machines, such physical network interfaces connected to the virtual switch, and the device pool is associated with the virtual entity. When a virtual computing instance is connected to the virtual entity, such as when initialized or after migrating between hosts, one or more physical hardware devices are automatically assigned from the device pool to the virtual computing instance based on the association of the device pool to the connected virtual entity. Thus, VMs can be flexibly and automatically provisioned with SR-IOV physical hardware when migrating between hosts using SR-IOV.

18 Claims, 7 Drawing Sheets

FLEXIBLE AUTOMATED PROVISIONING OF SINGLE-ROOT INPUT/OUTPUT VIRTUALIZATION (SR-IOV) DEVICES

CROSS-REFERENCE TO RELATED APPLICATIONS

This application claims the benefit of U.S. Provisional Patent No. 62/534,572, filed Jul. 19, 2017. The content of the provisional application is hereby incorporated by reference in its entirety.

BACKGROUND

In a network environment, one or more virtual machines (VMs) or other virtualized computing instances (e.g., containers (e.g., Docker containers), data compute nodes, isolated user space instances, etc.) may be implemented by a virtualization layer (e.g., hypervisor) running on host machines, which are physical computing devices coupled together by a physical network. References to VM herein should be understood as exemplary workloads, and in most cases other types of virtualized computing instances could easily be substituted with minimal impact on the architecture and operation of the hypervisor's datapath as described herein.

For each VM, the hypervisor on the host machine manages a corresponding virtual hardware platform that may include emulated hardware such as a virtual hard drive, virtual network interface (VNIC), virtual CPU, and/or guest physical RAM for the VM. The hypervisor may be responsible for taking requests to such emulated hardware, and translating them to requests (e.g., interrupts) to physical hardware devices (e.g., physical network interfaces (PNICS), physical CPUs, etc.) of the host machine.

For example, the host machines may be connected to a physical network via PNICs. Each VM (or other virtualized computing instance) may include one or more VNICs (or equivalent endpoint) for exchanging traffic with other entities on the network. The VNICs may behave similarly to PNICs. Each VNIC may connect to a virtual port of a virtual switch implemented by a hypervisor of the host machine to exchange traffic of the associated VM with other VMs on the host or other endpoints on the network. The hypervisor implementing the VM may further exchange packets with hypervisors (and corresponding VMs) running on other host machines via the PNIC of its host machine.

On hosts with large numbers of VMs exchanging numerous packets, a significant amount of CPU and other physical resources of the host may be required for the operation of the virtual switch.

Single-root input/output virtualization (SR-IOV) allows a physical hardware device (such as a physical component interconnect (PCI) device or PCI express (PCIe) device) referred to as a root to appear as multiple separate physical devices to the hypervisor or other system level software. For example, SR-IOV partitions resources of a physical hardware device into physical functions and virtual functions. The physical function is the primary function of the physical hardware device, and therefore can be used to configure the physical hardware device as well as move data in and out of the physical hardware device. A physical hardware device may have multiple physical functions (e.g., a dual port SR-IOV PNIC may have two separate physical functions) that is seen by the hypervisor or guest operating system as separate physical devices. The virtual functions are lightweight functions designed to only move data in and out of the device, but not configure the physical hardware device. Each physical function can be attached to multiple virtual functions. Accordingly, each physical hardware device can have multiple virtual functions. Each virtual function may have its own associated memory space (e.g., queues) and interrupt procedure for handling data input and output to the virtual function. Therefore, each virtual function may be presented to the hypervisor or guest operating system as a separate instance of the physical hardware device. For example, an SR-IOV PNIC may present as multiple virtual functions that can be accessed by VMs like separate PNICs.

Typically, an emulated hardware device (e.g., VNIC) of a VM is attached to a virtual function of a physical hardware device (e.g., PNIC) directly. For example, instead of the VNIC attaching to a virtual port of a virtual switch implemented by a hypervisor of a host machine, the VNIC is assigned or attached to the virtual function, thereby bypassing the virtual switch. In certain aspects, instead of a VNIC, the VM includes a pass-through function or driver that passes data directly between the VM and the virtual function. Accordingly, though certain aspects are described herein with respect to a VNIC of a VM attached to a virtual function, in certain aspects the VM may be directly attached to the virtual function (e.g., via a pass through function) so that the virtual function appears to the guest like a directly attached physical network interface device. Further, it should be understood that though certain embodiments are described herein with respect to VNICs as emulated hardware devices, and PNICs as physical hardware devices, similar techniques may be applied to other emulated hardware devices corresponding to other physical hardware devices.

Typically, for SR-IOV devices, a VNIC of a VM (or the VM itself) is configured to be tied to a specific physical function (e.g., a specific PNIC) during configuration of the VM. Though certain embodiments are described herein as a VM being tied to a specific PNIC for ease of explanation, it should be noted that the VM may instead be tied to a specific physical function of a PNIC. Direct attachment of a VNIC of a VM to a physical function of a PNIC of the host machine may pose challenges when the VM moves to a different hardware (e.g., a destination host machine such as during VM migration). For example, when using SR-IOV, the step of tying the VNIC of the VM being created on the destination host machine to a specific physical function of a physical hardware device of the destination host machine needs to be performed again for the destination host machine. However, such selection of the physical function may need to be performed manually to ensure proper configuration of the VM. For example, a user may manually request (e.g., using a user interface, such as a drop-down menu) from a central server that the VNIC of the VM be tied to a specific physical function. The central server may further maintain a mapping of virtual functions to physical functions. The central server may then assign a virtual function mapped to the selected physical function to the VNIC. In addition to requiring manual selection of the physical function, the mapping is managed by a user and, thus, prone to manual error by the user and is also time consuming.

SUMMARY

Herein described are one or more embodiments of a method for assigning physical hardware devices in a data center using SR-IOV. The method generally includes the steps of defining a device pool associated with a virtual entity in the data center, the device pool identifying available physical hardware devices of one or more host machines, the device pool being associated with the virtual entity; connecting the virtual computing instance to the virtual entity; and automatically assigning one or more physical hardware devices from the device pool to the virtual computing instance based on the association of the device pool to the connected virtual entity.

Also described herein are embodiments of a non-transitory computer-readable storage medium storing instructions that, when executed by a computer system, cause the computer system to perform the method described above for assigning physical hardware devices in a data center using SR-IOV by defining a device pool associated with a virtual entity and automatically assigning physical hardware devices from the associated device pool when a virtual computing instance is connected to the virtual entity.

Also described herein are embodiments of a computer system programmed to carry out the method described above for assigning physical hardware devices in a data center using SR-IOV by defining a device pool associated with a virtual entity and automatically assigning physical hardware devices from the associated device pool when a virtual computing instance is connected to the virtual entity.

DETAILED DESCRIPTION

Embodiments presented herein relate to flexible and automated provisioning of VMs on host machines with SR-IOV devices by using a new logical container. Accordingly, the provisioning of the VMs is decoupled from the underlying physical SR-IOV hardware, as further described below.

As used herein, the term "packet" may refer generally to a group of bits that can be transported together, and may be in another form, such as "frame", "message", "segment", etc. In some embodiments, the packet may include a payload (e.g., data) and header information, such as a source address corresponding to the address of the network location that generated the packet, a source port corresponding to the port of the network location that generated the packet, a destination address corresponding to the address of the destination location, a destination port corresponding to the port of the destination location, and/or a protocol used for the packet.

Figure 1:
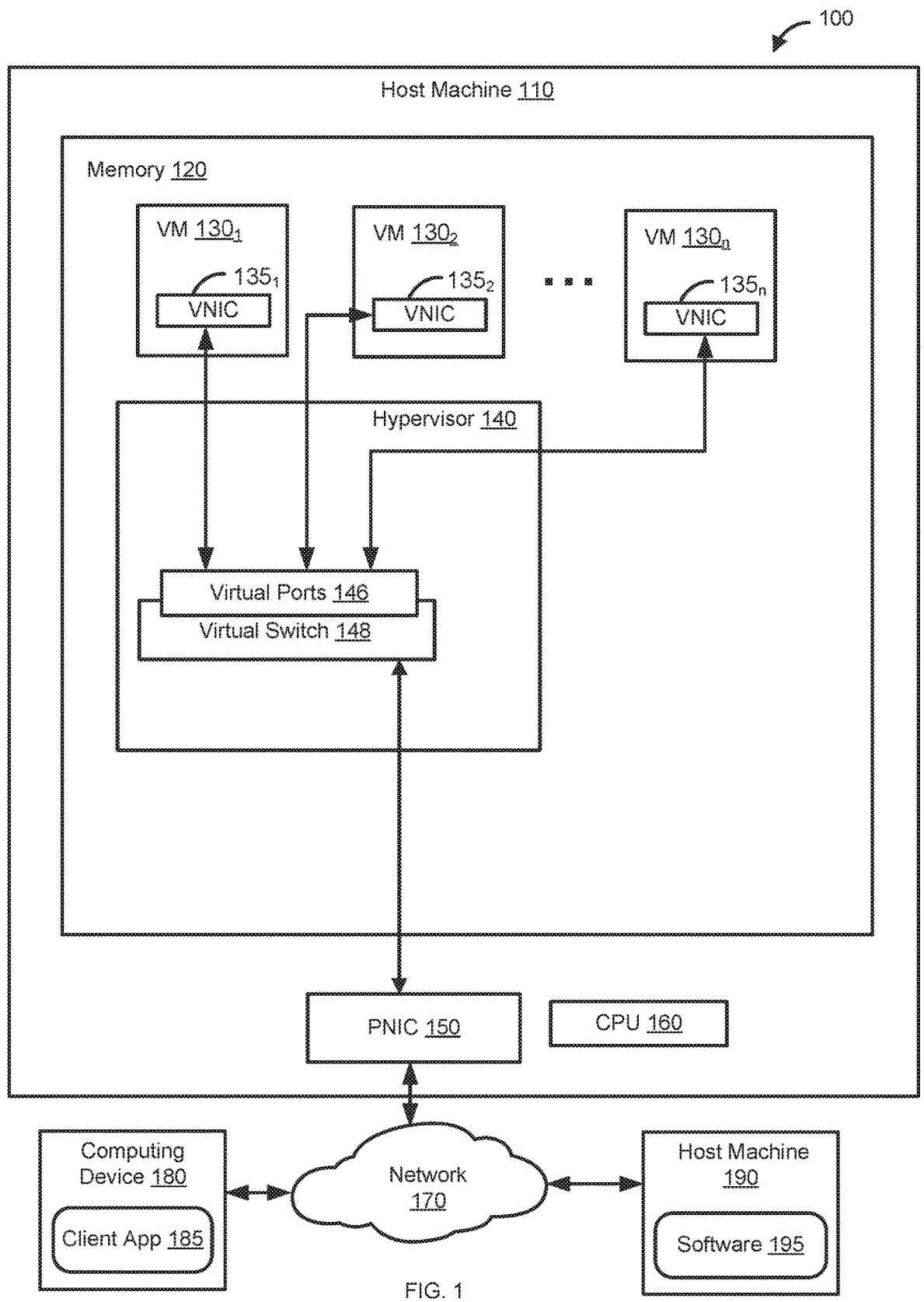
FIG. 1 illustrates components of an example system in which an embodiment may be implemented.

FIG. 1 illustrates components of a system 100 in which an embodiment may be implemented. As shown, system 100 is a virtualized environment that includes host machine 110, a physical network 170, a host machine 190, and a computing device 180. In some embodiments, host machine 110 may be constructed on conventional hardware platforms that include one or more central processing units shown as CPU 160, memory 120, and physical network interface controllers shown as PNIC 150. CPU 160 may execute instructions stored in memory 120 that perform one or more operations described herein. Although a host machines 110, 190, and a single computing device 180 are depicted, it should be understood that a virtualized environment may generally include any number of such devices or may not include certain such devices connected to network 170.

Host machine 190 can be configured similarly to host machine 110. Software 195 can include hypervisors, VMs, a guest operating system (OS), containers, an OS, and the like, as well as applications. Computing device 180 can execute a client application 185. Computing device 180 can include a computer, laptop, tablet, mobile device, or the like. Client application 185 can communicate using application programming interface (API) commands.

Network 170 can include various physical routers, switches, and like network appliances that facilitate communication between host machine 110, host machine 190, and computing device 180.

Host machine 110 may execute a virtualization layer shown as hypervisor 140 that is stored in memory 120. Hypervisor 140 may further implement VMs $130_1$, $130_2$, ... $130_n$. Hypervisor 140 abstracts processor, memory, storage, and/or networking resources into multiple virtual machines (e.g., VMs $130_1$, $130_2$, ... $130_n$) that run side-by-side on the same physical host machine 110. That is, hypervisor 140 partitions physical host machine 110 into multiple secure and portable virtual machines. Each virtual machine represents a complete system—with processors, memory, networking, storage, and/or BIOS. In one embodiment, hypervisor 140 can be installed directly on host machine 110 and inserts a virtualization layer between the hardware and the operating system. Alternatively, hypervisor 140 may run in conjunction with a conventional operating system in host machine 110. In yet another implementation (not shown) hypervisor 140 includes system level software component and a privileged virtual machine that may contain physical device drivers (not shown) virtual switch 148, or other hypervisor components.

VMs $130_1$, $130_2$, ... $130_n$ may each include a software-based virtual network adapter (or other network endpoint) shown as VNICs $135_1$, $135_2$, ... $135_n$, respectively, that are in communication with a physical network adapter shown as PNIC 150 included in host machine 110 that provides physical network access for VMs $130_x$. Virtual switch 148 may serve as a physical network switch, i.e., serve as an edge device on the physical network, but implemented in software, shown as virtual switch 148 implemented by hypervisor 140. Virtual switch 148 includes virtual ports 146 as an interface between virtual switch 148 and VNICs $135_1$, $135_2$, ... $135_n$. In some cases, VMs $130_1$, $130_2$, ... $130_n$ may implement one or more containers, such as Docker containers, and may be referred to as a workload or network endpoint. Alternatively, in place of hypervisor, a bare-metal computer operating system may be implemented on host machine 110, and in place of VMs 130, a plurality of name-space containers may be implemented by the operating system. In this case, the bare-metal operating system may implement a virtual switch to pass network communications to and from each of the containers, each of which may have its own IP and MAC addresses.

Figure 2:
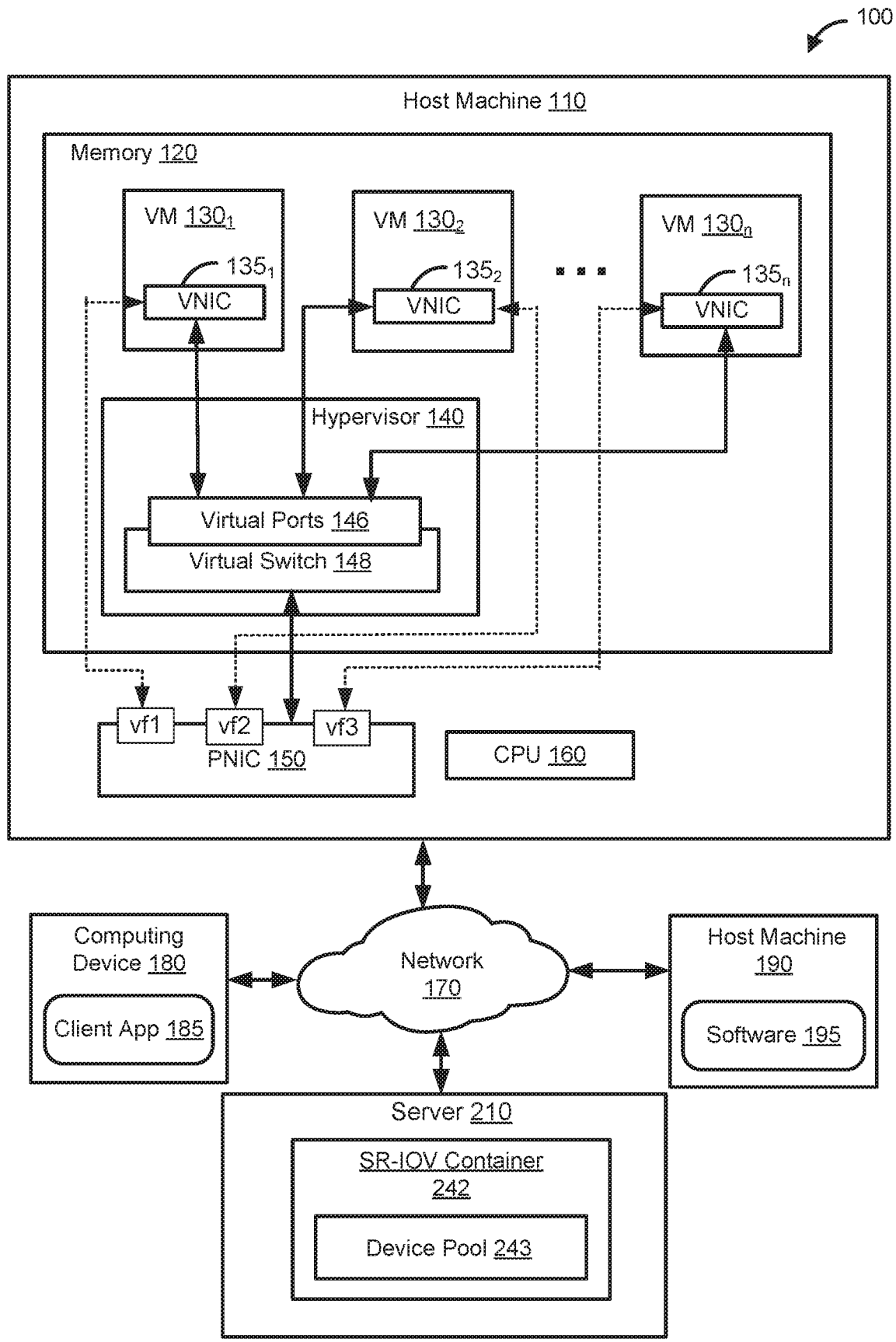
FIG. 2 illustrates components of an example system using SR-IOV in which an embodiment may be implemented.

In the system 100 illustrated in FIG. 1, each VM 130 is connected to virtual switch 148 and virtual switch 148 connects to PNIC 150. Thus, all of the traffic for the VMs 130 goes through virtual switch 148. Further, traffic between VMs 130 and other devices on network 170 goes through PNIC 150. As previously described, may be desirable to configure system 100 to take advantage of SR-IOV capabilities of PNIC 150. As shown in FIG. 2, for SR-IOV, PNIC 150 (e.g., a physical function of PNIC 150) can be configured to implement multiple virtual functions (although shown as vf1, vf2, vf3, different numbers of virtual functions can be implemented). VNICs 135 are logically connected to the virtual functions. From the perspective of VMs 130, each VM 130 has direct access to PNIC 150, thus, the single physical hardware appears as multiple separate physical hardware to VMs 130. Although not shown in FIG. 2, in some embodiments, certain VMs can be connected to the virtual functions using SR-IOV techniques, while other VMs are connected to virtual switch 148 as shown in FIG. 1.

In previous approaches for SR-IOV, provisioning of a VM required the user (e.g., the network administrator) to manually select the PNIC (e.g., physical function of the PNIC) to be associated with the VM, for example, from a drop-down menu of the user interface (not shown). Further, any time the VM is moved to a different host, the selection has to be repeated since the underlying PNIC is different for the different host. Thus, in the previous approach, additional configuration would be required to migrate a VM from one host to another host.

Embodiments herein provide techniques for flexibly and automatically provisioning VMs 130 for SR-IOV to decouple provisioning of VMs 130 from the underlying hardware.

One technique for flexible SR-IOV provisioning includes using an additional logical container, such as SR-IOV Container 242 shown in FIG. 2 for provisioning of the VMs 130. As shown in FIG. 2, a server 210 includes SR-IOV container 242. Server 210 may include one or more servers that perform management functions, such as configuring hosts. In some aspects, server 210 may be a virtual computing instance running on a host configured to perform management functions. Server 210 may be coupled to host machine 110 via physical network 170 or a separate management network (not shown). SR-IOV container 242 includes device pool 243 (also referred to as SriovDevicePool). Device pool 243 contains objects (e.g., identifiers, settings, location (e.g., identifier of host machine), etc.) corresponding to SR-IOV devices (e.g., physical functions of SR-IOV devices). For example, device pool 243 may be a group (e.g., list or set) of objects corresponding to SR-IOV devices. All the SR-IOV devices in device pool 243 may have similar properties. Further, there may be multiple SR-IOV containers 242 with different device pools 243 for different groups of SR-IOV devices with different properties. The devices can include network devices, graphic devices, etc. According to one embodiment, an object in device pool 243 is created automatically when a SR-IOV PNIC (e.g., a PNIC 150 supporting SR-IOV) is associated with (e.g., attached to) a virtual switch, such as virtual switch 148, distributed virtual switch. As a distributed entity, multiple instances of the distributed virtual switch on multiple hosts may be configured and managed as a single switch. Each instance may be connected to a different PNIC. For example, the distributed virtual switch implemented on each host may share the same configuration across each host on which the distributed virtual switch is configured, and share state. The term, "virtual switch" is used herein to refer to both non-distributed virtual switches and distributed virtual switches and instances thereof.

For example, server 210 may be configured to manage topology information for a network including VMs and virtual entities implemented at each host. Accordingly, server 210 may configure the connections between virtual switches and PNICs. Such a device pool 243 can include a switch key or switch identification (ID) of the virtual switch, thereby associating device pool 243 to the virtual switch. In this case, the device pool 243 consists of all the PNICs which are connected to the same virtual switch. Thus, each SR-IOV capable PNIC attached to a virtual switch is bundled into a pool of SR-IOV devices. In other words, the virtual switch is mapped to the device pool. According to an embodiment, a different device pool is created/maintained for each virtual switch, for example, as described in more detail below with respect to FIG. 2.

Connection to a switch is one example for creation of objects in the device pool(s). In some embodiments, device pools can be created based on other factors, such as PNIC type, etc.

When a VM 130 is provisioned on hardware by server 210 or other management or control plane server, the server may assign VM 130 to a physical device (e.g., physical function of a PNIC) used for VM 130 (e.g., for VNIC 135 of VM 130) by server 210. In the example described above, by indicating which virtual switch VM 130 is connected to, the underlying physical device may be chosen automatically by server 210 based on the connected virtual switch. In such cases, though VM 130 is defined as connected to a virtual switch, VM 130 may only use the connection to the virtual switch to configure a direct connection to the underlying physical device, and communicate directly with a virtual function of the underlying physical device and not via the virtual switch. Accordingly, when a VM 130 is referred to as being "connected to" the virtual switch, it may not be an actual connection, but instead a logical association with the virtual switch at a user interface level to be used to configure the VM 130 as directly connected to a virtual function of an underlying physical device. Thus, in some embodiments, the virtual switch does not process packets for the VMs 130 (e.g., communicated with the VNICs 135) that are configured for SR-IOV. However, in some embodiments, the networking configuration (e.g., such as a virtual local area network (VLAN) or Quality of Service (QoS) configurations) associated with the virtual switch 146 can be applied at the virtual function level to virtual functions of the PNIC 150 based on PNIC 150 being connected to virtual switch 146. For example, the network configuration of virtual switch 146 may be applied by a virtual function of the PNIC 150 to which VM 130 is connected based on PNIC 150 being connected to virtual switch 146. Thus, devices in a device pool may be configured to operate according to the network configuration(s) of the virtual switch to which the devices are connected. The creation of the SR-IOV pools, therefore, can be based on the networking configuration(s). In one embodiment, a VM 130 is created on/moves to a host machine 110 and defined as attached to a virtual port of virtual switch 148 by server 210. Accordingly, VM 130 may be automatically assigned by server 210 to one of the SR-IOV devices identified in device pool 243 associated with virtual switch 148. Therefore, assignment of the VM 130 to new physical hardware can be automatic based on the objects in the SR-IOV container 242.

Figure 3:
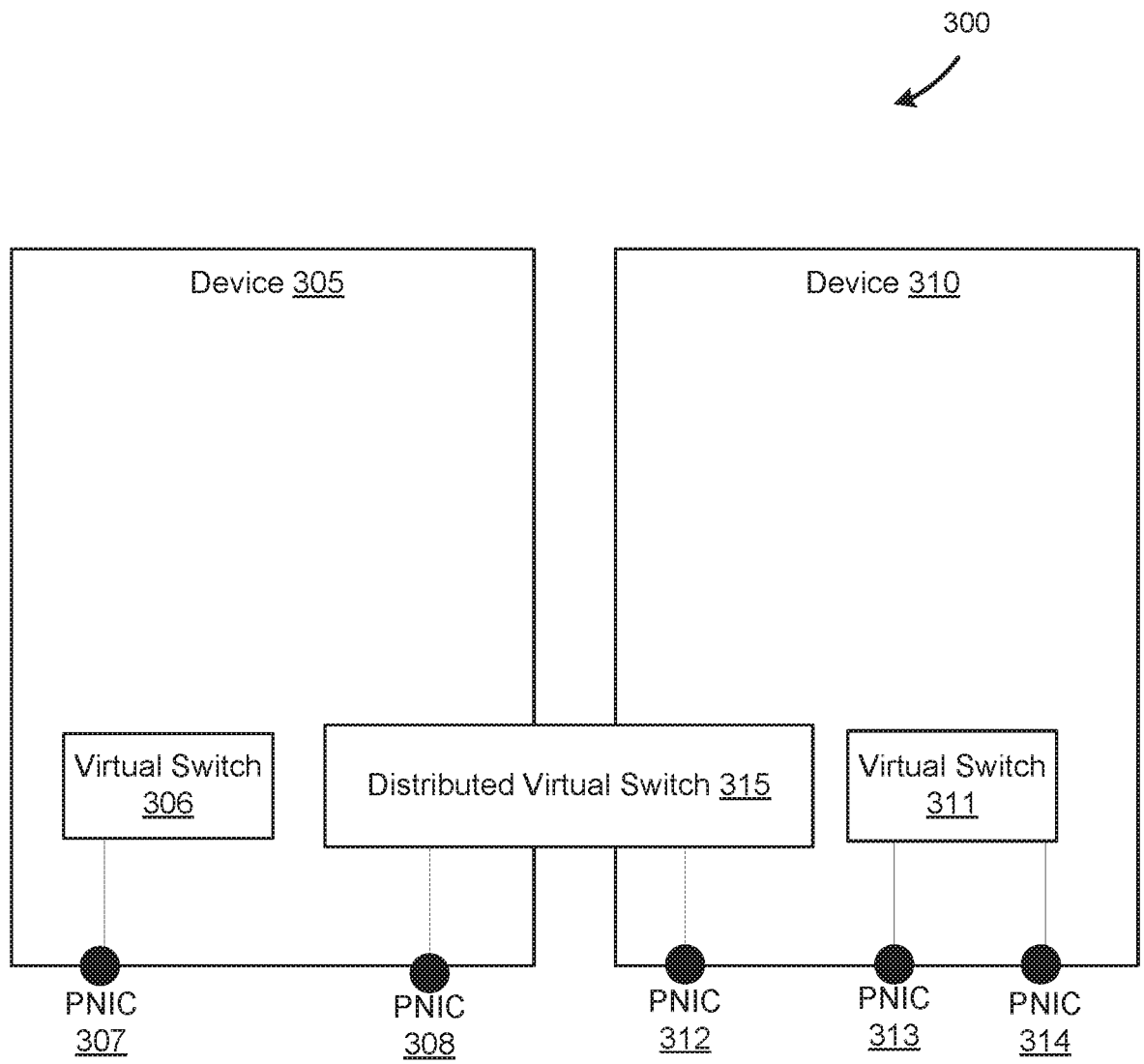
FIG. 3 illustrates an example SR-IOV topology for which device pool logical containers can be created, according to an embodiment.

FIG. 3 is an example topology 300 of devices included in a network. As shown in FIG. 3, the example topology 300 includes device 305 (e.g., such as host machine 110) and device 310 (e.g., such as another host machine). Device 305 includes virtual switch 306 connected to PNIC 307 (e.g., to a physical function of PNIC 307). Device 310 includes virtual switch 311 connected to PNIC 313 (e.g., to a physical function of PNIC 313) and PNIC 314 (e.g., to a physical function of PNIC 314). As shown in FIG. 3, device 305 and device 310 are both connected to distributed virtual switch 315 via PNIC 308 (e.g., to a physical function of PNIC 308) and PNIC 312 (e.g., to a physical function of PNIC 312), respectively.

Figure 3A:
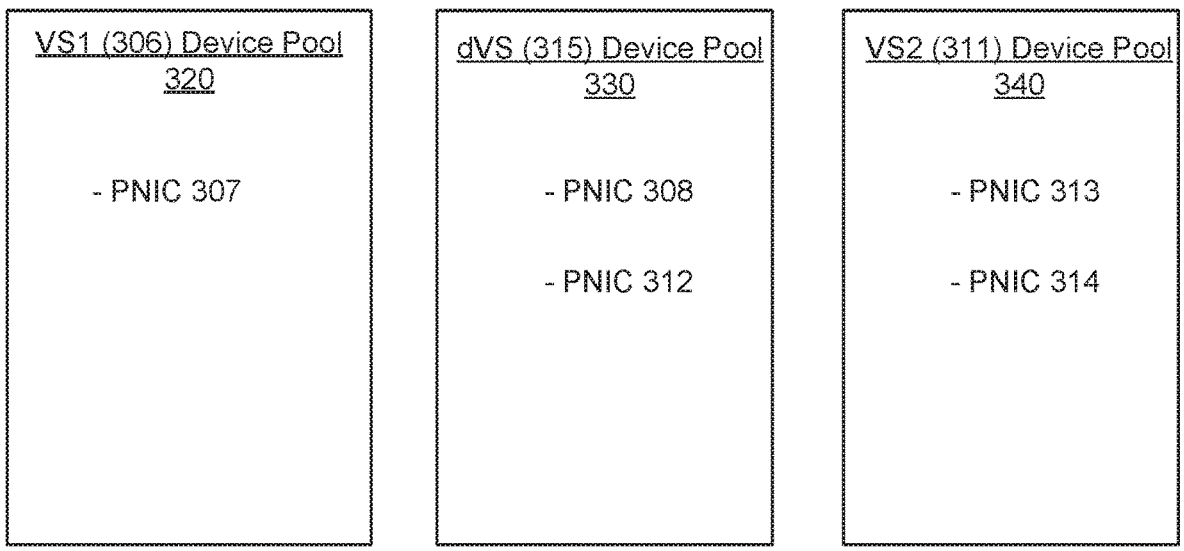
FIG. 3A illustrates example device pool logical containers for the example SR-IOV topology shown in FIG. 3, according to an embodiment.

FIG. 3A illustrates example device pool logical containers for the example topology 300 shown in FIG. 3, according to an embodiment. For the example topology 300, three device pools 320, 330, and 340 can be created—one for the connections to each virtual switch 306, 315, and 311. For example, device pool 320 includes the PNIC 307 (associated with virtual switch 306 (VS1)); device pool 330 includes the PNIC 308 and the PNIC 312 (associated with the distributed virtual switch 315 (dVS)); and device pool 340 includes the PNIC 313 and the PNIC 314 (associated with the virtual switch 311 (VS2)). Accordingly, when a VM is configured on a particular network and a particular host machine, server 210 identifies the virtual switch on the host machine associated with the network (e.g., based on a mapping of networks to virtual switches at server 210), identifies the pool (e.g., based on an identifier of the virtual switch associated with the pool) associated with the virtual switch, and choses a PNIC from the pool that is resident on the particular host machine (e.g., based on an identifier of the host machine associated with the PNIC in the pool) to assign to the VM.

Figure 4:
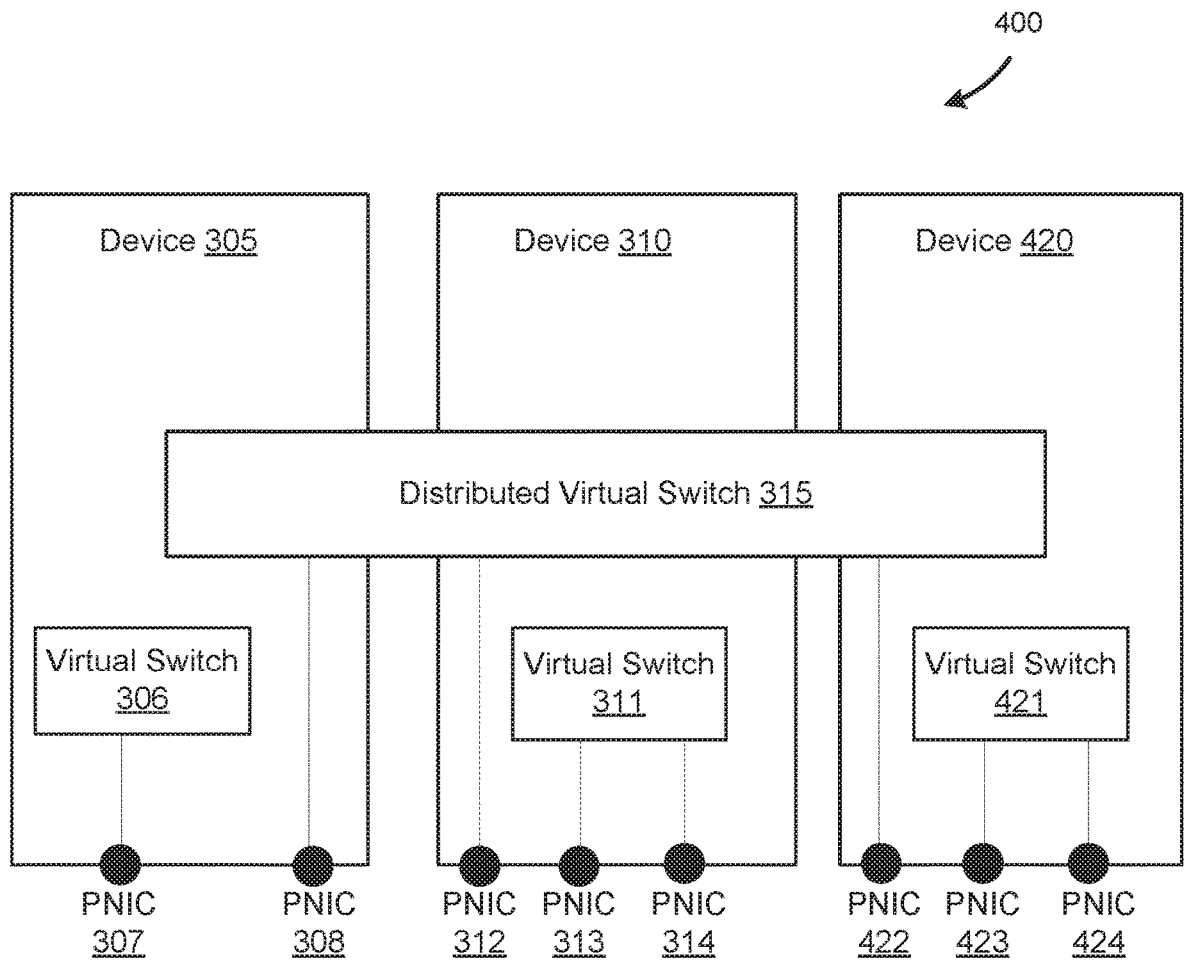
FIG. 4 illustrates the example SR-IOV topology of FIG. 3 with an additional device dynamically added, according to an embodiment.
Figure 4A:
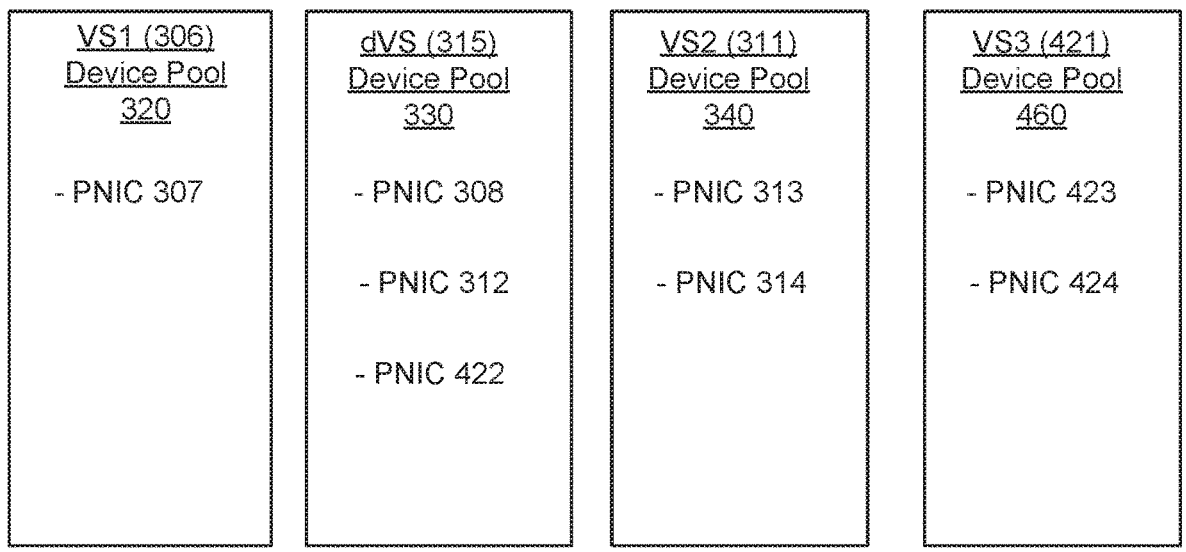
FIG. 4A illustrates example dynamic update to the device pool logical containers for the example SR-IOV topology shown in FIG. 4, according to an embodiment.

FIG. 4 illustrates the example SR-IOV topology 300 of FIG. 3 with an additional device dynamically added, according to an embodiment. As shown in FIG. 4, device 420 is dynamically added to the SR-IOV topology 400. The device 420 includes virtual switch 421 and PNICs 422, 423, and 424. PNIC 422 is connected the distributed virtual switch 315 and PNICs 423 and 424 are connected to the virtual switch 421. When the device 420 is added to the topology 400, the logical container can also be dynamically updated. For example, as shown in FIG. 4A, the device pool 330 is updated to include the PNIC 422 and a new logical container is created for device pool 460. The device pool 460 includes the PNIC 423 and PNIC 424 associated with the virtual switch 421 (VS3).

In some embodiments, the server 210 may select the PNIC randomly. In some embodiments, the PNIC is selected based on load-balancing. The VMs can also be moved to different hosts associated with different device pools, allowing for load-balancing. In some embodiments, the assignment of the physical functions and virtual functions, as well as the load-balancing, are performed only when the VM is powered on. If a VM is not powered-on it will not have any physical functions or virtual functions assigned to it.

Not all PNICs in a host machine share the same properties, such as network attributes (e.g., quality of service (QoS), throttling, etc.) that are derived based on the PNIC's association with a switch. In one example, as shown in FIG. 4, PNIC 307 is associated with virtual switch 306 and PNIC 308 is associated with the distributed virtual switch 315. PNIC 307 can have first properties, such as network attributes associated with the virtual switch 306 and PNIC 308 can have a different properties, such as network attributes associated with the distributed virtual switch 315. Thus, although PNIC 307 and PNIC 308 are on the same host (device 305), the PNICs can have different properties. Similarly, the PNICs on the devices 310 and 420 have different properties based on the associated switches. As shown in FIG. 4A, different device pools are created for the different switches (e.g., associated with different network attributes). When a VM connected to a SRIOV device is created (or migrated) on one of the hosts (device 305, 310, 420) and is attached to one network (e.g., via one of the switches 306, 311, 421, 325) then an appropriate PNIC should be selected. For example, if a VM is created on device 305 and attached to the network associated with virtual switch 306, then PNIC 307 should be selected (from device pool 320) for the VM.

Figure 5:
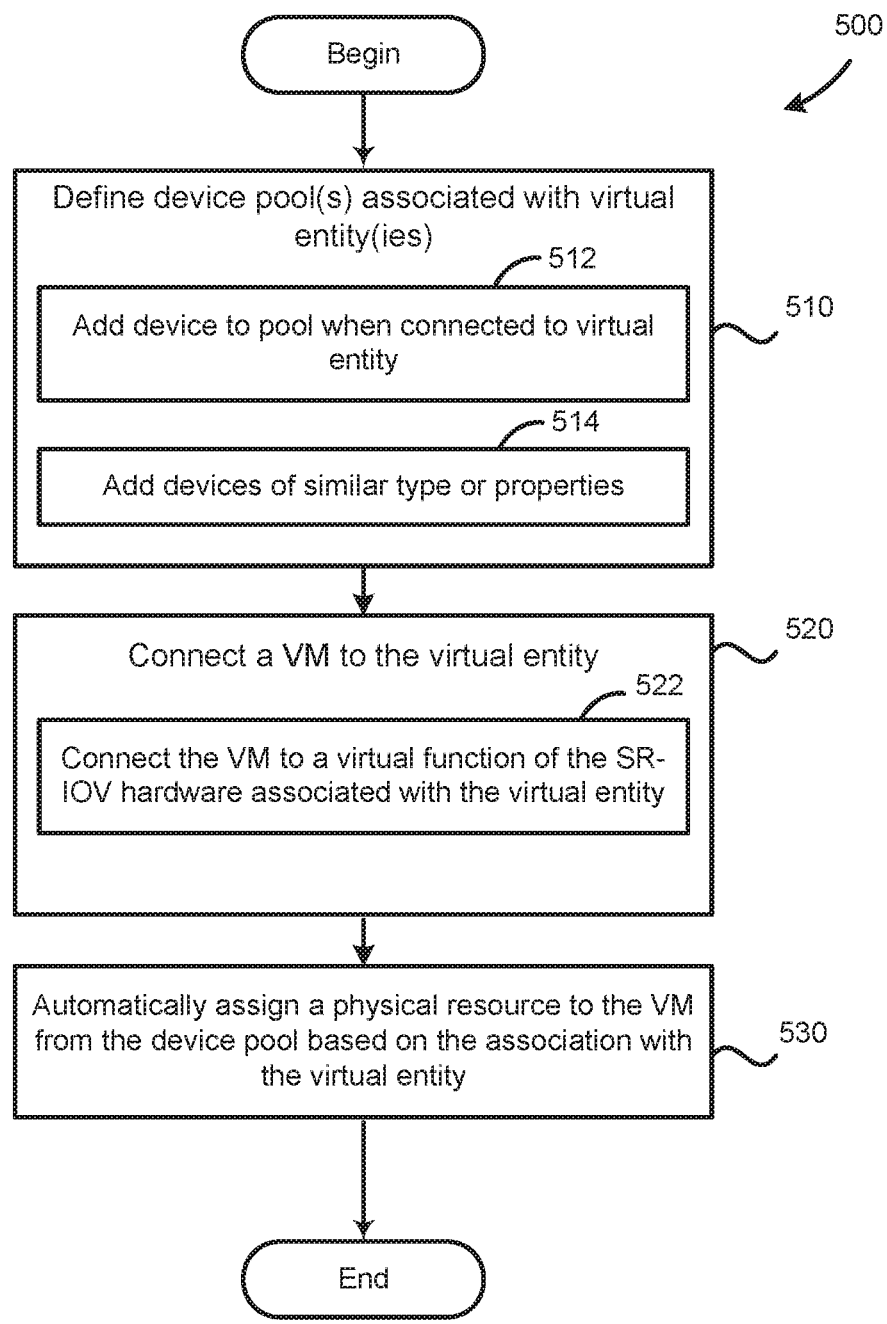
FIG. 5 is a flow diagram illustrating example operations performed by a virtual switch for flexibly provisioning VMs in a system using SR-IOV, according to an embodiment.

FIG. 5 illustrates example operations 500 for flexible and automatic VM provisioning in a network using SR-IOV, according to an embodiment. The operations 500 may be performed by a management entity, such as a management server or a management VM (e.g., server 210).

The operations 500 begin, at 510, by defining device pools associated with virtual entities. For example, server 210 can define one or multiple device pools, such as the device pool 243 including objects in the SR-IOV container 242 described above with respect to FIGS. 2-4A. In one example, at 512, server 210 can define a device pool for each virtual switch implemented in a network including the PNICs connected to each virtual switch. In another example, at 514, server 210 can define device pools including PNICs of a similar type and/or having similar properties.

At 520, a VM is provisioned on a host machine as connected to a virtual entity (e.g., virtual switch). For example, a VM is initialized on or migrated to a host machine. To connect to the virtual entity, at 522, the VM is conceptually connected to the virtual entity via a virtual function (VF) presented by an SR-IOV device attached to the virtual entity. As part of configuration of the VM, it is assigned one or more physical resources (e.g., such as a PNIC or physical function). As shown at 530, a physical resource is automatically assigned to the VM from the device pool based on the association with the virtual entity. For example, server 210 accesses the SR-IOV container associated with the virtual entity (e.g., with the virtual switch) and assigns one of the physical hardware devices identified in the device pool from the SR-IOV container. The VM is then connected directly to the virtual function of the assigned physical hardware device, bypassing the hypervisor. The VM may directly communicate with the virtual function, and not via the virtual entity that the VM is defined as connected to. Instead, the VM may merely use the connection to the virtual entity to configure assignment and connection to the virtual function of the physical hardware device.

In some embodiments, server 210 is responsible for receiving network configuration inputs (e.g., through an application programming interface). Users (e.g., network administrators) may further input network configuration data through, e.g., a command-line interface, a graphical user interface, etc. Each network configuration for a network, in some embodiments, may include data defining one or more endpoints (e.g., virtual machines or containers) and the connections between the endpoints.

Server 210 further generates desired state data that specifies how the network should be implemented in the physical infrastructure based on network configuration input. The server 210 then configures the hosts based on the network configuration input.

According to certain aspects, server 210 may receive user-defined input (e.g., by the user or administrator of the network) that enables (e.g., selects or activates) the function of the automatic assignment. Thus, the automatic assignment of the physical resource to the VMs from the associated device pool, at 530, can be configured by the user input selecting automatic assignment functionality.

The techniques described herein may enable flexible provisioning of SR-IOV devices. For example, the VM does not need to be manually assigned to a PNIC. When the VM is migrated to a different host, the user (e.g., administrator) can ensure that the networks match and that the VM is connected to the same network. In its destination host, any PNIC is selected/assigned from the device pool associated with the network. Thus, the VM provisioning does not use manual input for the assignment of the physical hardware and avoids manual errors from such input.

Certain embodiments as described above involve a hardware abstraction layer on top of a host computer. The hardware abstraction layer allows multiple contexts or virtual computing instances to share the hardware resource. In one embodiment, these virtual computing instances are isolated from each other, each having at least a user application running therein. The hardware abstraction layer thus provides benefits of resource isolation and allocation among the virtual computing instances. In the foregoing embodiments, virtual machines are used as an example for the virtual computing instances and hypervisors as an example for the hardware abstraction layer. As described above, each virtual machine includes a guest operating system in which at least one application runs. It should be noted that these embodiments may also apply to other examples of virtual computing instances, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The computer readable media may be non-transitory. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method for assigning physical resources to a virtual computing instance in a data center, the method comprising:
defining a device pool associated with a virtual entity in the data center, the device pool identifying available physical hardware devices of one or more host machines associated with the virtual entity, wherein the physical hardware devices comprise at least one physical network interface (PNIC);
connecting the virtual computing instance to the virtual entity; and
in response to the connecting, automatically selecting and assigning one or more of the physical hardware devices from the device pool to the virtual computing instance based on the association of the device pool to the connected virtual entity without a user further selecting the one or more of the physical hardware devices after the connecting.

2. The method of claim 1, wherein the virtual entity comprises a virtual switch, wherein defining the device pool comprises automatically adding a PNIC to the device pool in response to the PNIC connecting to the virtual switch.

3. The method of claim 1, wherein connecting the virtual computing instance to the virtual entity includes migrating the virtual computing instance from a previous host device to a current host device that includes the virtual entity.

4. The method of claim 1, wherein automatically assigning the one or more physical hardware devices is based on load balancing of at least one of: the virtual computing instance or the physical hardware devices.

5. The method of claim 1, wherein the physical hardware devices comprise single-root input/output virtualization (SR-IOV) devices.

6. The method of claim 1, wherein the device pool comprises physical hardware devices that are of a common type, have common properties, or both.

7. A non-transitory computer readable medium comprising instructions to be executed in a computer system, wherein the instructions when executed in the computer system perform a method for assigning physical resources in a virtual data center, the method comprising:
defining a device pool associated with a virtual entity in the data center, the device pool identifying available physical hardware devices of one or more host machines associated with the virtual entity, wherein the physical hardware devices comprise at least one physical network interface (PNIC);
connecting the virtual computing instance to the virtual entity; and
in response to the connecting, automatically selecting and assigning one or more of the physical hardware devices from the device pool to the virtual computing instance based on the association of the device pool to the connected virtual entity without a user further selecting the one or more of the physical hardware devices after the connecting.

8. The non-transitory computer readable medium of claim 7, wherein the virtual entity comprises a virtual switch, wherein defining the device pool comprises automatically adding a PNIC to the device pool in response to the PNIC connecting to the virtual switch.

9. The non-transitory computer readable medium of claim 7, wherein connecting the virtual computing instance to the virtual entity includes migrating the virtual computing instance from a previous host device to a current host device that includes the virtual entity.

10. The non-transitory computer readable medium of claim 7, wherein automatically assigning the one or more physical hardware devices is based on load balancing of at least one of: the virtual computing instance or the physical hardware devices.

11. The non-transitory computer readable medium of claim 7, wherein the physical hardware devices comprise single-root input/output virtualization (SR-IOV) devices.

12. The non-transitory computer readable medium of claim 7, wherein the device pool comprises physical hardware devices that are of a common type, have common properties, or both.

13. A computer system comprising:
at least one processor coupled with a memory, wherein the memory stores system software for the at least one processor to execute a method for assigning physical resources in a virtual data center, the method comprising:
defining a device pool associated with a virtual switch in the data center, the device pool identifying available physical network interfaces (PNICs) of one or more host machines associated with the virtual switch;
connecting a virtual machine to the virtual switch; and
in response to the connecting, automatically selecting and assigning one or more of the PNICs from the device pool to the virtual machine based on the association of the device pool to the connected virtual switch without a user further selecting the one or more of the PNICs after the connecting.

14. The computer system of claim 13, wherein defining the device pool comprises automatically adding a PNIC to the device pool in response to the PNIC connecting to the virtual switch.

15. The computer system of claim 13, wherein connecting the virtual machine to the virtual switch includes migrating the virtual machine from a previous host device to a current host device that includes the virtual switch.

16. The computer system of claim 13, wherein automatically assigning the one or more PNICs is based on load balancing of at least one of: the virtual machine or the PNICs.

17. The computer system of claim 13, wherein the PNICs are associated with single-root input/output virtualization (SR-IOV) devices.

18. The computer system of claim 13, wherein the device pool identifies PNICs that are of a common type, have common properties, or both.

* * * * *